United States Patent [19]

Magne

[11] Patent Number: 5,505,237

[45] Date of Patent: Apr. 9, 1996

[54] AIRCRAFT REFUELLING INSTALLATION

[75] Inventor: Michel Magne, Paris, France

[73] Assignee: Elf Antar France, Courbevoie, France

[21] Appl. No.: 224,298

[22] Filed: Apr. 7, 1994

[30] Foreign Application Priority Data

Apr. 22, 1993 [FR] France .................................. 93 04754

[51] Int. Cl.⁶ .................................. B65B 1/04; B65B 3/00
[52] U.S. Cl. .................................. 141/388; 141/94; 141/279; 14/69.5; 14/71.1; 14/72.5; 137/615; 137/342
[58] Field of Search .................................. 141/388, 387, 141/94, 279; 14/69.5, 71.1, 72.5; 244/135 R, 135 A; 137/615, 342

[56] References Cited

U.S. PATENT DOCUMENTS

| | | | |
|---|---|---|---|
| 3,521,316 | 7/1970 | Adams et al. | 14/71 |
| 3,859,481 | 1/1975 | Sprague | 191/12 R |
| 3,983,590 | 10/1976 | Anderberg | 14/69.5 |
| 4,205,308 | 5/1980 | Haley et al. | 141/387 |
| 4,298,176 | 11/1981 | Kendall | 244/135 A |
| 4,828,033 | 5/1989 | Frison | 166/307 |
| 4,898,211 | 2/1990 | Fournier et al. | 141/387 |

FOREIGN PATENT DOCUMENTS

| | | |
|---|---|---|
| 0393229 | 10/1990 | European Pat. Off. . |
| WO87/03025 | 5/1987 | WIPO . |

*Primary Examiner*—Henry J. Recla
*Assistant Examiner*—Steven O. Douglas
*Attorney, Agent, or Firm*—Oblon, Spivak, McClelland, Maier & Neustadt

[57] ABSTRACT

In order to carry out the refuelling of an aircraft, use is made of an installation associated with the loading bridge used for the transfer of passengers between the air terminal and the aircraft. The installation includes a retractable extension mechanism supported by the loading bridge and a deformable hose permanently connecting a pressure intake of a fuel distribution network to a coupling carried by the extension mechanism. The installation is controlled by the energy available on the loading bridge from a console. It can be partly or totally automated.

14 Claims, 3 Drawing Sheets

AIRCRAFT REFUELLING INSTALLATION

BACKGROUND OF THE INVENTION

The invention relates to an installation for refuelling an aircraft from a pressurized fuel distribution network.

1. Field of the Invention

At present there are two main methods for refuelling aircraft in airports.

A first method relates to the airports equipped with a pressurized fuel distribution system having at least one pressure intake located in the vicinity of each of the aircraft parking points. It consists of using small trucks known as servicers, which are connected to the probes of the system in order to refuel the aircraft. Each servicer constitutes an autonomous unit which is brought to the parking point when an aircraft requires refuelling. The servicer is equipped with one or more connecting hoses, a fuel filtration system, a counter, a certain number of valves and safety devices, as well as a lifting platform enabling an operator to connect the hoses to the aircraft fuel filling ports. Operation of the various equipments is ensured by in particular hydraulic and pneumatic energy sources installed on the servicer.

Although used in certain airports, this refuelling procedure suffers from important disadvantages.

More particularly, so that the energy sources available on the servicer can be used, it is indispensable for its engine or motor to remain in operation throughout refuelling. This is clearly unsatisfactory from the a safety standpoint.

In addition, servicers are expensive vehicles and consequently their number is limited for each airport. Therefore these vehicles must permanently travel from one point to another within the airport, which constitutes a potential risk for an accident and can sometimes delay flights.

In addition, the distribution of fuel by means of the servicer generally takes place by a single operator, who controls all the operations either from the servicer lifting platform, or from an external platform. This leads to relatively long response times, which means that the injection of the fuel is sometimes stopped too late and fuel is therefore discharged onto the ground by the overflows of the tanks of aircraft. This is obviously unsatisfactory both from the financial and an ecological standpoint.

Moreover, remote control of the servicers also has the consequence of a loss of reliability due to disturbances in the vicinity of the aircraft in the case where a remote control means is utilized, or a risk results of a out-out or disconnection occurring when a cable control is used.

The second refuelling method used at present and which is also the more common, relates to all airports and in particular those not equipped with a pressurized fuel distribution system. It consists of using fuel tenders also known as bowsers, which have one or more tanks for receiving the fuel, as well as equipment like that of the servicers. These fuel tenders permanently travel backwards and forwards between a storage site, often located outside the airport, and the aircraft parking points.

In view of the fact that their equipment is comparable to those of the servicers, fuel tenders suffer from the same disadvantages as the latter. Moreover, the travelling within airports of fuel tenders carrying very large quantities of fuel causes an important safety problem.

In addition to these two existing refuelling methods, EP-A-291 876 discloses a refuelling device having a trolley or truck on which is mounted a pipe or hose formed from rigid segments articulated to one another and terminated by a coupling fixable to the fuel filling port of aircraft. The opposite end of the pipe or hose can be connected to a pressure intake of a pressurized fuel distribution network. The trolley can also be equipped with means for filtering the fuel, counting means and one or more valves.

Compared with conventional refuelling methods, the use of such a device makes it possible to reduce costs and simplifies the operations which have to be carried out for refuelling an aircraft. However, a certain number of problems remain, in particular the safety problem resulting from the need of maintaining a motor in operation for driving the different energy sources, particularly hydraulic and pneumatic sources, which are installed on the trolley.

SUMMARY OF THE INVENTION

The present invention relates to a novel refuelling installation making it possible to refuel aircraft safely at low cost using means which can be easily put into use in a particularly rapid manner.

According to the invention, this result is obtained by means of an installation for refuelling an aircraft having at least one port for filling fuel from a pressurized fuel distribution network, incorporating at least one pressure intake located in the vicinity of an aircraft parking point, and a loading bridge giving access to said aircraft and equipped with energy supply means, characterized in that said installation has:

- at least one motorized, retractable, extension mechanism mounted on the end of the loading bridge and terminated by a coupling which can be connected to the filling port,
- at least one deformable hose for being lengthened travelling along the loading bridge and the extension mechanism between the pressure intake and the coupling and
- means for checking the fuel injected by the deformable hose, wherein said installation is controlled from the energy supply means equipping the loading bridge.

Through the use of the energy supply means available on existing loading bridges, it becomes possible to refuel aircraft without a motor or engine being permanently maintained in operation during the refuelling process. Therefore safety is greatly improved.

Moreover, due to the fact that the installation is integrated into existing loading bridges, it is possible to refuel aircraft without requiring any movement of a vehicle on the ground, which also improves safety. This feature also significantly simplifies the refuelling operations and shortens their duration.

As a function of the particular case, the extension mechanism can be remotely controlled from a control console located within the loading bridge, or constituted by a completely automatic, robotized mechanism.

In the first case, the installation advantageously has at least one video camera positioned in the vicinity of the extension mechanism, a video monitor located on the control console and means for transmitting images between the camera and the monitor.

No matter what control type is used for manipulating the extension mechanism, proximity detectors are advantageously placed at the end of said mechanism, in order to facilitate the connection of the coupling placed at the end of the extension mechanism to the aircraft fuel filling port.

In a preferred embodiment of the installation according to the invention, use is made of an aircraft identification badge, such as an ultra-high frequency badge and on which are stored informations relative to said aircraft (aircraft type, airline, registration, etc.) A receiver positioned on the loading bridge then receives the information stored on the badge.

In the case where the extension mechanism is a robotized and entirely automated, the information stored on the badge advantageously include the coordinates of the fuel filling port.

The use of an aircraft identification badge also facilitates invoicing. To this end, means for the acquisition of counting data relative to the fuel supplied can be placed on the control station. With said counting data acquisition means are associated means for transmitting, to a processing center, counting data and information stored on the badge.

In a preferred embodiment of the invention, the extension mechanism is a motorized, tubular arm forming a hose section. This motorized, tubular arm can incorporate several reciprocally articulated segments, at least one of which is advantageously telescopic. The hose also has a section associated with the loading bridge and which, according to the particular case, can either be formed with articulated segments, or can be constituted by a flexible hose.

BRIEF DESCRIPTION OF THE DRAWINGS

The invention is described in greater detail hereinafter relative to non-limitative embodiments and with reference to the attached drawings, wherein.

DESCRIPTION OF THE PREFERRED EMBODIMENTS

Figure 1:
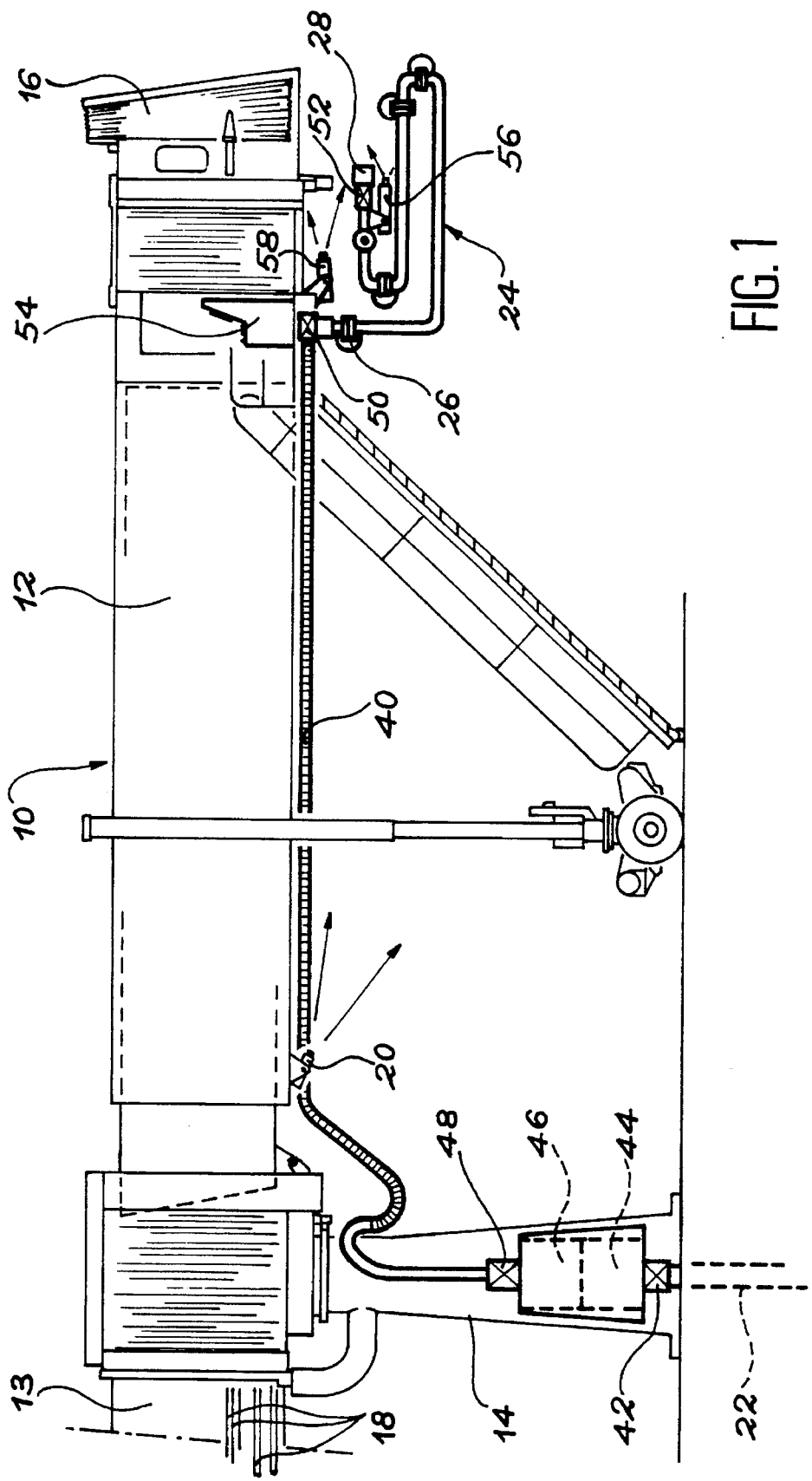
FIG. 1 shows a side view of a loading bridge giving access to an aircraft and with which is associated an installation for refuelling said aircraft constructed according to the invention.

In the drawings, reference numeral 10 designates in general terms a loading bridge designed so as to permit the transfer of passengers between an air terminal AG and an aircraft AN (FIG. 3) positioned in a parking bay in the vicinity of said terminal. It is important to observe that the loading bridge 10 is well known and can assume numerous different configurations without passing outside the scope of the present invention.

It is merely pointed out here that a loading bridge 10 giving access to aircraft forms a corridor, whose fixed end issues directly into a lounge within the terminal AG. The opposite end of the loading bridge 10 can be moved between an inactive position relatively close to the terminal and an active position in which said end is flush with the aircraft AN facing one of its access doors. To this end, such loading bridges 10 generally have at least one variable length, telescopic, central section 12, whose end closest to the terminal AG rests on a pillar 14, so as to be able to pivot about the vertical axis of the latter. A fixed section 13 giving access to the terminal links a lounge within said terminal AG with the central section 12. At its opposite end, the telescopic, central section 12 has a section 16 giving access to the aircraft and which is generally articulated about a vertical axis on the central section 12.

The loading bridge 10 is controlled by an operator located in the aircraft-access section 16. The operator has for this purpose a not shown control station. The electrical, hydraulic, pneumatic and similar power making it possible to control the manipulations of the loading bridge 10 from the control station come from external sources generally located within the air terminal and are carried to the interior of the loading bridge by cables and pipes diagrammatically illustrated at 18 in FIG. 1. The control station for the loading bridge 10 normally has one or more video screens carrying images supplied by one or more video cameras such as the camera 20 in FIG. 1.

According to the invention, the loading bridge 10 is used for supporting and supplying with energy or power an aircraft refuelling installation. Said installation is connected to a pressure intake 22 of a pressurized fuel distribution network equipping the airport in question. The pressure intake 22 is in the immediate vicinity of the pillar 14 or is in the bottom thereof, as illustrated in FIG. 1.

The refuelling installation according to the invention comprises a motorized, retractable, extension mechanism 24, whereof one end is fixed to the loading bridge 10 in the vicinity of its end for docking with the aircraft.

In the embodiment illustrated in the drawings, the extension mechanism is fixed beneath the floor of the central section 12, at the end of said section which carries the aircraft-access section 16. Moreover, the extension mechanism is in the form of a motorized, tubular arm 24, whereof one end is fixed beneath the floor of the central section 12 by a rotary joint 26 and whose free end carries a coupling 28, which can be tightly connected to an aircraft refuelling port.

The structure of the motorized, tubular arm 24 is such that it can occupy a retracted position (FIG. 1), in which it is completely retracted below the loading bridge 10 and an extended position (FIGS. 2 and 3), in which the arm projects beyond the end of the bridge, so that the coupling 28 can be positioned facing the aircraft fuel filling port O when the bridge 10 is at least partly extended and when the aircraft is parked at the corresponding point.

The structure of the motorized, tubular arm 24 can assume all configurations making it possible to reach the two extreme positions referred to hereinbefore. For example, in the configuration of the motorized, tubular arm illustrated in the drawings, said arm is formed from three consecutive, tubular segments, which are articulated with one another by rotary joints. The rotary movements permitted by the rotary joints are chosen so as to define the number of degrees of freedom necessary to enable the coupling 28 to be positioned and oriented in satisfactory manner with respect to the fuel filling port O of an aircraft AN of a random type. If necessary, one or more tubular sections forming the motorized, tubular arm 24 can be telescopic.

Each of the rotary and translatory movements of the tubular arm 24 is controlled by a motor. When the extension mechanism is constituted by a motorized, tubular arm 24 in the manner illustrated in the drawings, said arm forms a section of a deformable hose, whereof a second section, illustrated at 40 in the drawings, permanently connects the pressure intake 22 to the joint 26. This second section 40 passes along the loading bridge 10, e.g. below the floor of the central section 12, as well as along the pillar 14 or within the latter.

The circuit followed by the fuel between the pressure intake 22 and the coupling 28 incorporates a certain number of means for controlling the fuel injected into the aircraft, in the same way as existing refuelling units. Thus, (FIG. 1), at the outlet of the pressure intake 22 there is a first cut-off or disconnection valve 42, downstream of which are located counting means or meter 44 and filtering means 46. A second cut-off valve 48 is preferably installed at the outlet of the filtering means 46. A third cut-off valve 50 is positioned upstream of the rotary joint 26 and a fourth cut-off valve 52 is associated with the end coupling 28.

According to the invention, the refuelling installation is controlled by means of energy available on the loading bridge 10. More specifically, the different motors equipping the motorized, tubular arm 24, the cut-off valves 42, 48, 50 and 52 and the counting means 44 are supplied with energy from the electrical, hydraulic, pneumatic and similar energy carried on the loading bridge 10 by the cables and pipes 18. Consequently, the refuelling installation according to the invention is operated without any motor having to be kept permanently functioning during the filling of tanks of the aircraft. Therefore, the safety conditions are significantly improved as compared with existing refuelling installations.

In order to control the refuelling installation, the operator advantageously has a control console 54 (FIG. 1) installed in part of the loading bridge 10 which is to be docked with the aircraft. The control console 54 can in particular be installed in the end of the central section 12, on which is articulated the aircraft-access section 16.

Operation of the refuelling installation and in particular the operations of extending the motorized, tubular arm 24 and connecting the coupling 28 to the aircraft fuel filling port can either be entirely automated, or can be remotely controlled from the control console 54.

In the case where the refuelling installation operation is entirely automated, it is controlled by a not shown, programmable robot. In order to take account of the fact that the fuel filling ports are not at the same point on all aircraft, the extension of the motorized, tubular arm is preferably carried out taking account of the information stored on an e.g. ultra-high frequency, aircraft identification badge. This badge then stores information relative to the aircraft in question such as its type, its company, its registration and the coordinates of the fuel filling port.

In view of the fact that the position of the end of the loading bridge and the position and orientation of the aircraft on its parking point can be accurately known, the information stored on the badge can be utilized by a receiver placed on the loading bridge 10 so as to control an extension of the motorized, tubular arm 24 enabling the coupling 28 to arrive in the vicinity of the aircraft fuel filling port. The final approach and the tight connection can be ensured by fitting proximity detectors to the end of the motorized, tubular arm, in accordance with procedures used in robotics.

When the aircraft identification badge is an ultra-high frequency badge, the transmission of information between the badge and the receiver takes place remotely. However, an identical result can be obtained by using a badge of a different type, such as a magnetic badge, which must then be introduced by the operator into a reader provided for this purpose. This reader can in particular be installed on the control console 54.

When operation of the refuelling installation according to the invention is remotely controlled from the control console 54, the operator controls the extension of the motorized, tubular arm 54 from informations supplied to him by one or more video receivers present on the control console 54. These video receivers then receive images transmitted to them by one or more video cameras, whereof one camera 56 (FIG. 1) is installed on the end of the motorized, tubular arm 24. Another video camera 58 can be fitted to the end of the central section 12 of the loading bridge closest to the aircraft AN.

When the extension and docking of the motorized, tubular arm 24 are remotely controlled from the control console 54, the docking of the coupling 28 with the aircraft fuel filling port and the tight locking of the coupling can be carried out in an automated manner, as hereinbefore, or remotely controlled by the operator. In the same way, the subsequent putting into operation of the different valves and counting means 44 can be controlled by software or manually.

Figure 2:
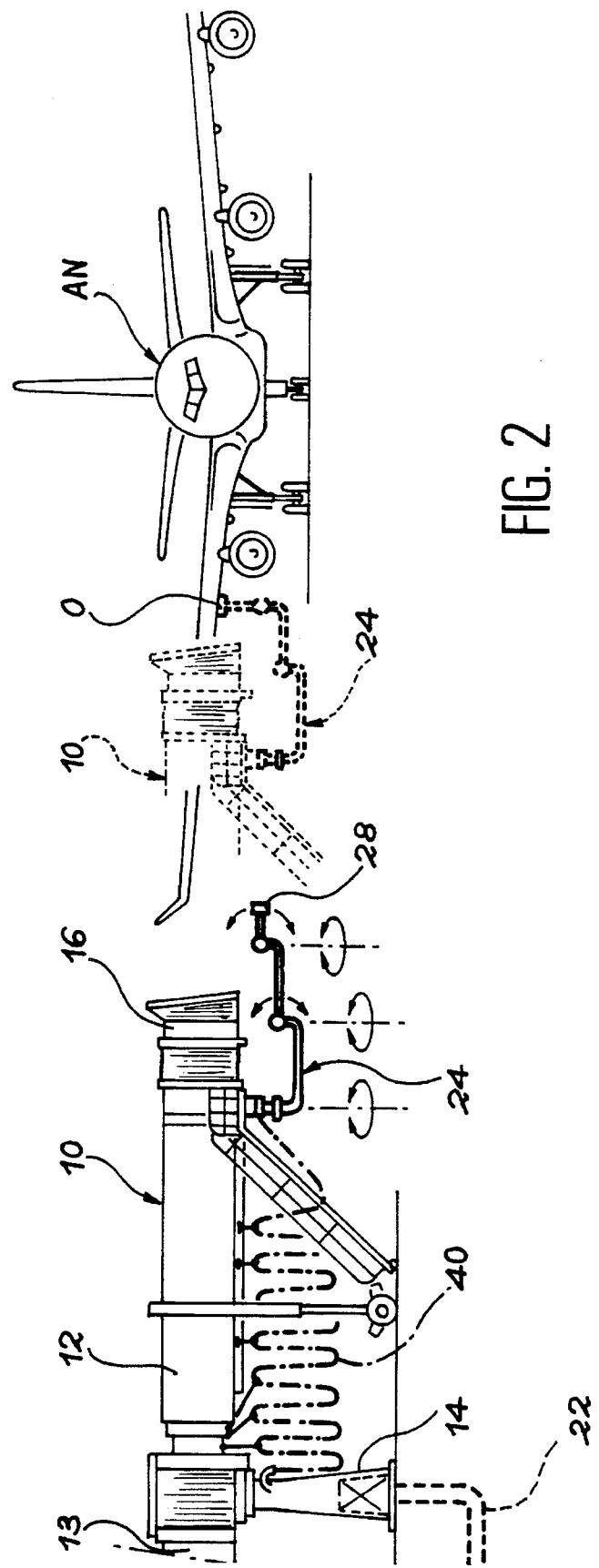
FIG. 2 is a view comparable to FIG. 1 diagrammatically illustrating the docking of the extension mechanism of the refuelling installation with an aircraft fuel filling port.
Figure 3:
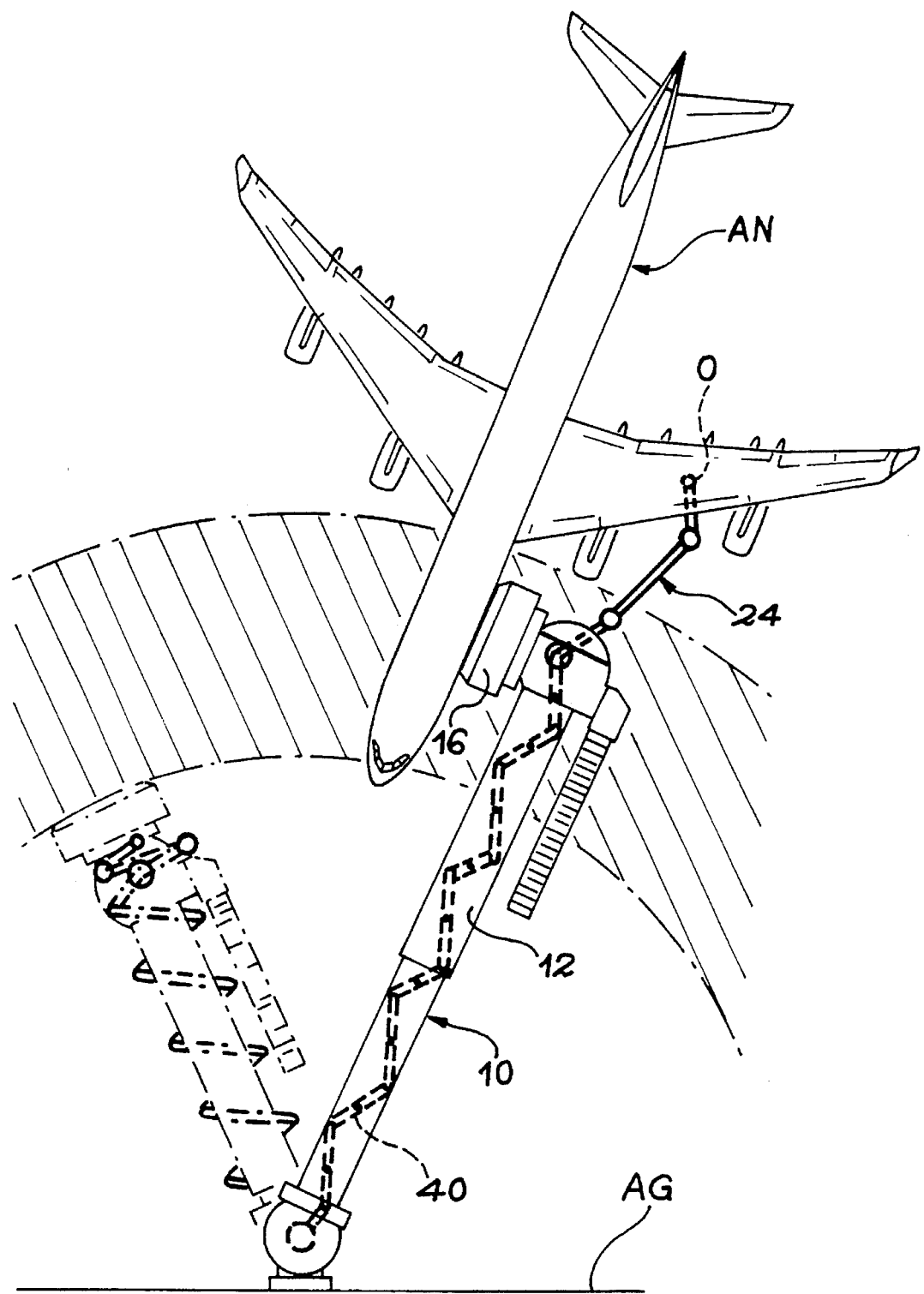
FIG. 3 is a plan view illustrating, in another configuration, the possibility of carrying out the refuelling of an aircraft when the loading bridge is occupying its position for the transfer of passengers.

As illustrated by the drawings, the hose section 40 passing along the central section 12 of the loading bridge 10 can be constituted either by a flexible hose supported at regular intervals by trolleys mounted on a rail positioned axially under the floor of the central section 12 (FIG. 2), or can be formed by rigid segments articulated to one another at their ends (FIG. 3). In the latter case, the rigid sections are positioned horizontally beneath the floor of the central section 12 of the loading bridge 10 and each of them is supported by a trolley, which slides on a rail extending axially beneath the floor of said section.

In the right-hand part of FIG. 2 is shown in discontinuous line form the case where refuelling takes place in a position of the loading bridge 10 not permitting the transfer of passengers. As illustrated in continuous line form in FIG. 3, refuelling can also take place when the loading bridge is docked with the aircraft so as to permit the transfer of passengers.

Finally, when using an aircraft identification badge, the information contained in the badge can be transmitted at the same time as counting data relative to the fuel supplied (quality, volume, etc.) to a processing center for said data and information, which then instantaneously produces the invoice and sends it to the company to which the aircraft belongs. To this end, the control console 54 advantageously incorporates counting data acquisition means, as well as means permitting the transmission of said data and informations stored on the badge to the processing center.

Obviously, the refuelling installation described hereinbefore can undergo numerous modifications without being outside the scope of the invention. Thus, the extension mechanism 24 can be constituted by an articulated and/or telescopic arm, whose end carries a coupling 28 mounted directly on the end of a deformable hose identical to the section 40 and which is then made in one piece. Moreover, if the overhang of the extension mechanism in its extended state is excessive, a support resting on the ground can be used. Finally, it is clear that the same loading bridge can have several extension mechanisms and several deformable hoses, so as to be able to simultaneously refuel several aircraft or several tanks of the same aircraft.

I claim:

1. An installation for refuelling an aircraft having at least one port for filling fuel from a pressurized fuel distribution network and including at least one pressure intake located in the vicinity of an aircraft parking position; which comprises:

a telescopic loading bridge providing access to said aircraft and equipped with an energy supply;

at least one motorized, retractable extension mechanism, mounted on an end of the loading bridge and terminated by a coupling which is adapted to be connected to the filling port, at least one deformable refuelling hose supported by the loading bridge and connected to the extension mechanism, said hose being deformed and lengthened upon telescoping of said loading bridge; and a mechanism controlling the fuel injected by the deformable hose, said extension mechanism being adapted to be controlled from the energy supply.

2. An installation for refuelling an aircraft having at least one port for filling fuel from a pressurized fuel distribution network and including at least one pressure intake located in the vicinity of an aircraft parking position which comprises:

a telescopic loading bridge providing access to said aircraft and equipped with an energy supply; at least one motorized, retractable extension mechanism, mounted on an end of the loading bridge and terminated by a coupling which is adapted to be connected to the filling port, at least one deformable refuelling hose supported by the loading bridge and connected to the extension mechanism; and a control console located in the loading bridge, said control console remotely controlling the extension mechanism.

3. Installation according to claim 2, which comprises at least one video camera placed at the end of the extension mechanism and a video monitor located on the control console.

4. Installation according to claim 2, wherein the end of the extension mechanism includes with proximity detectors.

5. An installation for refuelling an aircraft having at least one port for filling fuel from a pressurized fuel distribution network and including at least one pressure intake located in the vicinity of an aircraft parking position which comprises:

a telescopic loading bridge providing access to said aircraft and equipped with an energy supply;

at least one motorized, retractable extension mechanism, mounted on an end of the loading bridge and terminated by a coupling which is adapted to be connected to the filling port, and at least one deformable refuelling hose supported by the loading bridge and connected to the extension mechanism wherein the extension mechanism comprises an automatic, robotized mechanism.

6. An installation for refuelling an aircraft having at least one port for filling fuel from a pressurized fuel distribution network, including at least one pressure intake located in the vicinity of an aircraft parking position, which comprises:

a telescopic loading bridge providing access to said aircraft and equipped with an energy supply;

at least one motorized, retractable extension mechanism, mounted on an end of the loading bridge and terminated by a coupling which is adapted to be connected to the filling port, at least one deformable refuelling hose supported by the loading bridge and connected to the extension mechanism; and an aircraft identification badge located on the aircraft, on which is stored information relative to the aircraft and a receiver placed on the loading bridge, said receiver receiving the information stored on the badge.

7. Installation according to claim 6, wherein the information stored on the badge includes the coordinates of the fuel filling port.

8. Installation according to claim 6, wherein the control console includes a mechanism acquiring counting data relative to the fuel supplied and transmitting, to a processing center, counting data and information stored on the badge.

9. An installation for refuelling an aircraft having at least one port for filling fuel from a pressurized fuel distribution network and including at least one pressure intake located in the vicinity of an aircraft parking position, which comprises:

a telescopic loading bridge providing access to said aircraft and equipped with an energy supply;

at least one motorized, retractable extension mechanism, mounted on an end of the loading bridge and terminated by a coupling which is adapted to be connected to the filling port, and at least one deformable refuelling hose supported by the loading bridge and connected to the extension mechanism wherein the extension mechanism comprises a motorized, tubular arm forming a deformable hose section.

10. Installation according to claim 9, wherein the motorized, tubular arm has a plurality of segments articulated to one another and first motors controlling pivoting between the segments.

11. Installation according to claim 10, wherein at least one of the segments is telescopic and has a second motor controlling elongation of said segment.

12. An installation for refuelling an aircraft having at least one port for filling fuel from a pressurized fuel distribution network and including at least one pressure intake located in the vicinity of an aircraft parking portion, which comprises:

a telescopic loading bridge providing access to said aircraft and equipped with an energy supply;

at least one motorized, retractable extension mechanism, mounted on an end of the loading bridge and terminated by a coupling which is adapted to be connected to the filling port, and at least one deformable refuelling hose supported by the loading bridge and connected to the extension mechanism wherein the hose has a section connected with the loading bridge and formed from articulated segments.

13. An installation for refuelling an aircraft having at least one port for filling fuel from a pressurized fuel distribution network and including at least one pressure intake located in the vicinity of an aircraft parking position which comprises:

a telescopic loading bridge providing access to said aircraft and equipped with an energy supply;

at least one motorized, retractable extension mechanism, mounted on an end of the loading bridge and terminated by a coupling which is adapted to be connected to the filling port, and at least one deformable refuelling hose supported by the loading bridge and connected to the extension mechanism wherein the hose has a section connected with the loading bridge and comprises a flexible hose.

14. An installation for refuelling an aircraft having at least one port for filling fuel from a pressurized fuel distribution network and including at least one pressure intake located in the vicinity of an aircraft parking position, which comprises:

a telescopic loading bridge providing access to said aircraft and equipped with an energy supply;

at least one motorized, retractable extension mechanism, mounted on an end of the loading bridge and terminated by a coupling which is adapted to be connected to the filling port, and at least one deformable refuelling hose supported by the loading bridge and connected to the extension mechanism wherein the controlling mechanism comprises a fuel filter, a fuel supply quantity counter and valves located upstream and downstream of said filtering means and counting means.

* * * * *